Patented June 5, 1923.

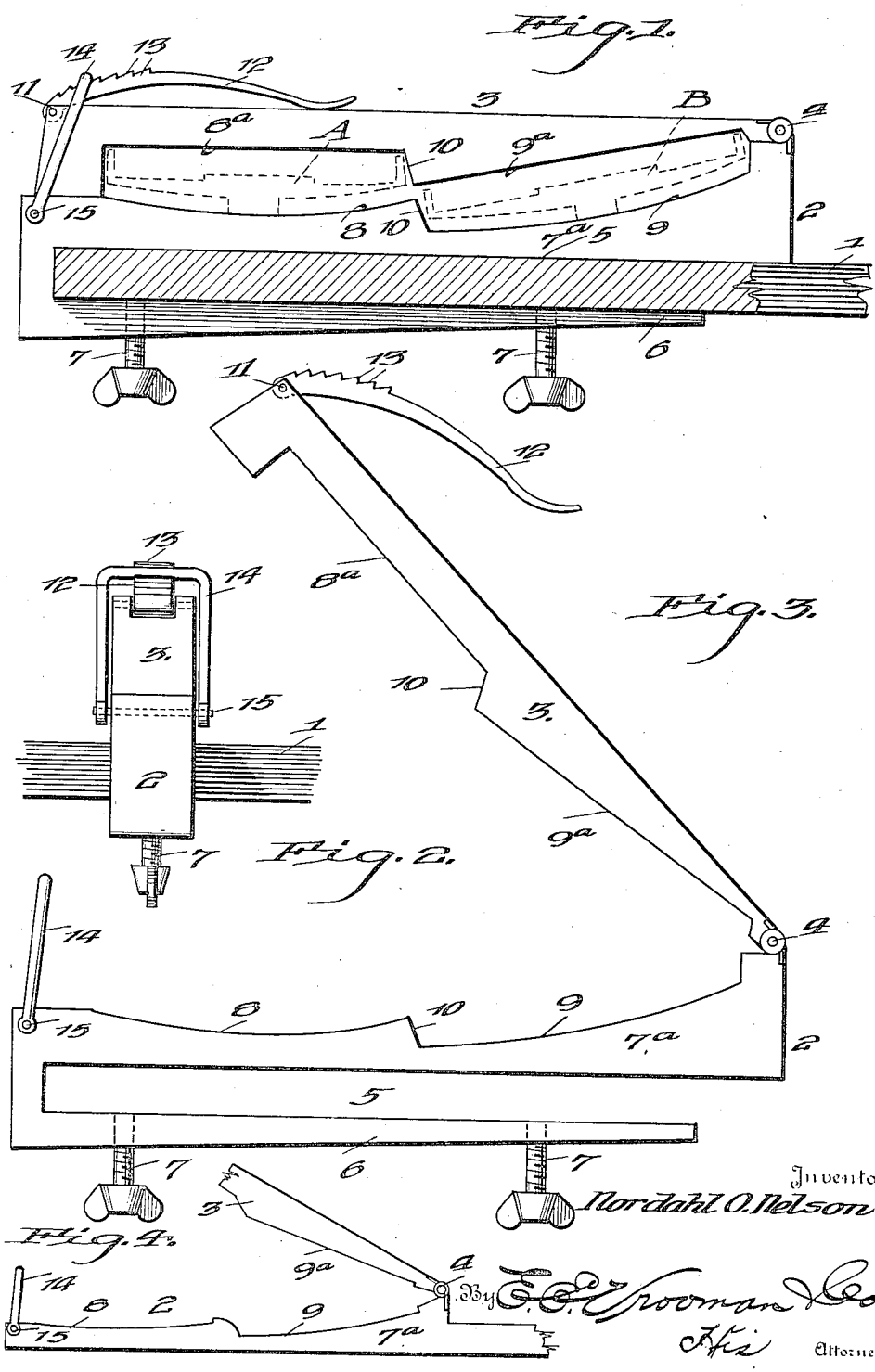

1,457,595

UNITED STATES PATENT OFFICE.

NORDAHL O. NELSON, OF WESTBY, WISCONSIN.

RUNNER CARRIER.

Application filed May 10, 1922. Serial No. 559,863.

*To all whom it may concern:*

Be it known that I, NORDAHL O. NELSON, a citizen of the United States, residing at Westby, in the county of Vernon and State of Wisconsin, have invented certain new and useful Improvements in Runner Carriers, of which the following is a specification, reference being had therein to the accompanying drawings.

This invention relates to a runner carrier, and has for its object the provision of simple and efficient means for supporting sleigh-like runners for vehicles upon a suitable support of a vehicle, such as a running-board of an automobile, and the like.

With this and other objects in view, my invention comprises certain novel combinations, constructions and arrangements of parts as will be hereinafter described, illustrated in the accompanying drawings, and more particularly pointed out in the appended claim.

In the drawings:

Figure 1 is a view, in side elevation, of a runner carrier constructed in accordance with the present invention.

Figure 2 is a front view of the same.

Figure 3 is a view, in elevation, of the runner carrier showing the same in an open position.

Figure 4 is a fragmentary view, in side elevation, of another embodiment of my invention, showing the lower part of the fixed jaw removed, and a bracket, or brackets, on the rear end, by means of which the device may be secured to the rear end, or any convenient place, of a vehicle.

Referring to the drawings by numerals, 1 designates a suitable support on a vehicle, such as a running-board of an automobile, and to which is attached my runner carrier.

The runner carrier comprises a primary or fixed jaw 2, and an auxiliary or hinged jaw 3; these jaws being connected by the hinge 4.

The primary jaw 2 is substantially U-shaped, so that the open portion 5 can straddle the support 1; the lower portion 6, of jaw 2, is adapted to bear against the under face of support 1, and this portion 6 carries clamping thumb-screw 7, whereby the jaw 2 can be securely fastened upon the support 1 by rotating the screw 7, causing the same to screw inwardly, against support 1. The upper portion 7ª, of jaw 2, is provided with a plurality of seats 8 and 9, which are adapted to support the runners A and B (dotted lines) Fig. 1. It is to be noted that the runner B (Fig. 1) is in more of a tilted position, to cause the same to clear the side of the automobile (not shown).

The auxiliary jaw is provided with corresponding seat portions 8ª and 9ª. The two jaws 2 and 3 are provided, near their center, with shoulders 10, against which the flanges of the runner frames A and B bear.

Pivotally mounted, at 11, upon the outer end of the auxiliary jaw 3, is a clasp 12. The clasp 12 is provided upon its upper, outer face with a plurality of teeth or corrugations 13, which are engaged by the yoke 14, which yoke 14 is pivotally mounted upon pin 15, on the outer end of jaw 2, and this yoke is adapted to straddle the outer end of jaw 3 and ride over a portion of the teeth or corrugations 13, and as the clasp 12 is slightly yieldable or "springy," a very secure locking device is produced by the yoke and clasp, which securely fastens the jaws together.

It is to be understood that the runner frames A and B are to be placed under motor vehicle wheels, or the like, to cause the vehicle to more readily pass over ice or snow. When the runner frames are not in use the operator can quickly mount the same upon the runner carriers, and for this purpose I preferably use two carriers on each vehicle, one for supporting one end of the runner frame, and the other for supporting the other end, so that the runner frames will be efficiently carried upon the vehicle.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

In a device of the class described, the combination of a primary jaw provided with upper and lower integrally connected portions, set screws on said lower portion, said upper portion provided with seats and with a shoulder near its center, an auxiliary jaw hingedly connected to said primary jaw at one end, said auxiliary jaw provided on its other end with a yieldable, pivotally mounted clasp, said clasp provided with teeth or corrugations, said auxiliary jaw provided with seats and with a central shoulder registering with the seats and shoulder on the primary jaw, and a yoke pivotally mounted on the outer end of said primary jaw adapted to straddle the outer end of the auxiliary jaw and engage said teeth or corrugations of the clasp, substantially as shown and described.

In testimony whereof I hereunto affix my signature.

NORDAHL O. NELSON.